(12) United States Patent
Lee et al.

(10) Patent No.: US 9,823,503 B2
(45) Date of Patent: Nov. 21, 2017

(54) TOUCH SCREEN LIQUID CRYSTAL DISPLAY DEVICE

(71) Applicant: LG Display Co., Ltd., Seoul (KR)

(72) Inventors: Jun-Yeob Lee, Daegu (KR); Dae-Lim Park, Gumi-si (KR); Sang-Bum Ko, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 201 days.

(21) Appl. No.: 14/811,590

(22) Filed: Jul. 28, 2015

(65) Prior Publication Data

US 2016/0033804 A1 Feb. 4, 2016

(30) Foreign Application Priority Data

Jul. 29, 2014 (KR) .................. 10-2014-0096688

(51) Int. Cl.
*G02F 1/1335* (2006.01)
*G02F 1/1333* (2006.01)
*G02F 1/1339* (2006.01)

(52) U.S. Cl.
CPC ............. *G02F 1/13338* (2013.01); *G02F 2001/13396* (2013.01); *G02F 2201/54* (2013.01); *G02F 2202/28* (2013.01)

(58) Field of Classification Search
CPC ....... G02F 1/13338; G02F 2001/13396; G02F 2201/54; G02F 2202/28
USPC .......................................................... 349/12
See application file for complete search history.

(56) References Cited

U.S. PATENT DOCUMENTS

| 2005/0200799 A1* | 9/2005 | Murai | G02F 1/1339 349/156 |
| 2013/0155347 A1* | 6/2013 | Yonemura | G02F 1/133308 349/58 |
| 2014/0014960 A1* | 1/2014 | Yamazaki | G06F 3/0412 257/59 |

FOREIGN PATENT DOCUMENTS

| JP | 2013-238729 A | 11/2013 |
| KR | 10-2001-0040071 A | 5/2001 |
| KR | 10-2012-0130467 A | 12/2012 |
| KR | 10-2013-0049108 A | 5/2013 |

OTHER PUBLICATIONS

Korea Intellectual Property Office, Office Action, Korean Patent Application No. 10-2014-0096688, dated May 20, 2015, five pages [with concise explanation of relevance in English].

* cited by examiner

*Primary Examiner* — Lucy Chien
(74) *Attorney, Agent, or Firm* — Fenwick & West LLP

(57) ABSTRACT

Disclosed is a touch screen liquid crystal display device (LCD) that includes a first substrate that includes a plurality of pixels defined by crossings of gate lines and data lines, each pixel including a thin film transistor; a second substrate that includes a color filter and a black matrix; a liquid crystal layer between the first substrate and the second substrate; a plurality of gap column spacers on the second substrate and contacting the first substrate; a press column spacer on the second substrate and spaced apart from the first substrate; and a third substrate attached to the second substrate, wherein the plurality of gap column spacers have a density of 0.05% to 0.11% with respect to a display region of the first substrate.

15 Claims, 3 Drawing Sheets

10

110

TOUCH SCREEN LIQUID CRYSTAL DISPLAY DEVICE

CROSS-REFERENCE TO RELATED APPLICATIONS

The present application claims the priority benefit of Korean Patent Application No. 10-2014-0096688 filed in Republic of Korea on Jul. 29, 2014, which is hereby incorporated by reference in its entirety for all purposes as if fully set forth herein.

BACKGROUND OF THE INVENTION

Field of the Invention

The present disclosure relates to a liquid crystal display device (LCD), and particularly, relates to a touch screen LCD.

Discussion of the Related Art

Recently, use of a touch screen has been generalized by user's demand to conveniently use electronic devices. In case of an external touch screen panel, there are a tape bonding type, a front surface bonding (i.e., a glass bonding type), a module type, or the like according to methods of attaching a touch sensor substrate onto a liquid crystal panel. The glass bonding type is a method that an optical adhesive is formed on an entire surface of a liquid crystal panel to couple a touch sensor substrate to the liquid crystal panel.

In case of the glass bonding type, a touch screen LCD is manufactured using a lamination process that an optical adhesive is formed on a liquid crystal panel where a thin film transistor (TFT) substrate and a color filter substrate are coupled to each other, and then a pressure is applied to attach a touch sensor substrate to the liquid crystal panel.

First, regarding processes of manufacturing a liquid crystal panel, a column spacer is formed on a black matrix layer of a color filter substrate, then a TFT substrate and the color filter substrate having the column spacer are coated with respective alignment layers, and then the alignment layers are rubbed.

Then, the TFT substrate and the color filter substrate are each cleaned, then a seal pattern is formed on peripheral portions of the TFT substrate, and then liquid crystal are dispensed on a predetermined region on the TFT substrate.

The color filter substrate not having liquid crystal thereon is overturned to face the TFT substrate, then the color filter substrate and the TFT substrate are pressurized and coupled, and then the seal pattern is hardened.

The column spacer is formed such that the column spacer is fixed to the color filter substrate and contacts the TFT substrate. In this case, when swiping across a surface of an LCD, there occurs a touch defect that brightness of the swiped portion is not uniform and a spot happens, and when pressing a surface of an LCD with a constant force, there occurs a press defect that a color filter substrate or TFT substrate is deformed and a spot occurs at the pressed portion.

To solve the above problems, a LCD is developed recently, which includes a gap column spacer contacting a TFT substrate and a press column spacer spaced apart from the TFT substrate, which are formed between a color filter substrate and a TFT substrate, to prevent a touch defect and a press defect.

According to densities of column spacer in an liquid crystal panel, a cold bubble phenomenon or gravity defect phenomenon occurs.

The cold bubble phenomenon is caused by a difference between a volumetric shrinkage rate of liquid crystal and a volumetric shrinkage rate of glass used for a substrate according to a temperature drop. Since the volumetric shrinkage rate of liquid crystal is greater than that of glass, the phenomenon occurs that an empty space happens between two substrates. This phenomenon occurs when a density of a gap column spacer is high.

The gravity defect phenomenon occurs because a volume of a liquid crystal layer in a liquid crystal panel increases as temperature rises. A cell gap of the liquid crystal panel becomes greater than a gap column spacer, and the phenomenon occurs that liquid crystal moves down due to gravity. This phenomenon occurs when a density of a gap column spacer is low.

FIG. 1 is a schematic view illustrating a density of a gap column spacer of a liquid crystal panel having a first substrate and a second substrate coupled to each other according to the related art, and FIG. 2 is a view illustrating a touch screen LCD having a third substrate and a liquid crystal panel coupled to each other through a lamination process according to the related art.

Referring to FIG. 1, a liquid crystal panel 10 includes a first substrate 11 which includes a plurality of pixels defined by gate and data lines crossing each other and each including a TFT, a second substrate 20 which includes a color filter and black matrix and on which a gap column spacer 30 and a press column spacer 35 are formed, and a liquid crystal layer 40 between the first and second substrates 11 and 20.

In a state that the liquid crystal panel 10 is not coupled with a third substrate (80 of FIG. 2) including a touch sensor through a lamination process, in order to prevent a cold bubble phenomenon and a gravity defect phenomenon of the liquid crystal panel 10 itself, it is enough for the gap column spacer 30 to be formed to have a density of 0.03% with respect to a display region of the liquid crystal panel 10.

For the purpose of explanations, in FIG. 1, a density or a number of the gap column spacer 30 are not shown exactly, and instead, one gap column spacer 30 is shown in a meaning that a density of the related art gap column spacer 30 is less than that of a gap column spacer (130 of FIG. 4) of an embodiment of the present disclosure.

Referring to FIG. 2, the related art touch screen LCD 110 is manufactured by coupling a third substrate 80 having a touch sensor with the liquid crystal panel 10 using an optical adhesive 60 therebetween. A seal pattern 50 is formed between edge portions of the first and second substrates 11 and 20 of the liquid crystal panel 10.

A cell gap of the liquid crystal panel 10 including the first and second substrates 11 and 20 is reduced by a pressure that is applied in a lamination process to couple the third substrate 80 with the liquid crystal panel 10, and then, after a period of time, the second substrate 20 receives a first tension F1 in a direction to the third substrate 80 by the third substrate 80 coupled to the second substrate 20, and receives a second tension F2 in a direction to the first substrate 11 by the gap column spacer 30 formed on the second substrate 20.

The first tension F1 is a force that the third substrate 80 attracts the second substrate 20 due to the coupling of the third substrate 80 with the second substrate 20 through the optical adhesive 60, and the second tension F2 is a force to maintain the attachment of the second substrate 20 and the first substrate 11 through the gap column spacer 30.

The first tension F1 is smaller at a center portion than at a peripheral portion, and the second tension F2 increases in proportion to a density or a number of the gap column spacer 30.

Accordingly, when a gap column spacer is formed at the density of the related art and a lamination process to couple the liquid crystal panel 10 with the third substrate 80 is conducted, a peripheral portion of the second substrate 20 receives the first tension F1 greater than the second tension F2 and thus moves upward. Thus, a cell gap of the liquid crystal panel 10 at the peripheral portion is greater than that at the center portion.

When the cell gap of the liquid crystal panel 10 becomes greater, liquid crystal moves to a peripheral portion of the liquid crystal 10 having the greater cell gap, thus a transmittance of liquid crystal changes at the peripheral portion, and thus a yellowish phenomenon happens.

SUMMARY

Accordingly, the present invention is directed to a touch screen LCD that can prevent a yellowish phenomenon.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present invention, as embodied and broadly described herein, a touch screen liquid crystal display device (LCD) includes a first substrate that includes a plurality of pixels defined by crossings of gate lines and data lines, each pixel including a thin film transistor; a second substrate that includes a color filter and a black matrix; a liquid crystal layer between the first substrate and the second substrate; a plurality of gap column spacers on the second substrate and contacting the first substrate; a press column spacer on the second substrate and spaced apart from the first substrate; and a third substrate attached to the second substrate, wherein the plurality of gap column spacers have a density of 0.05% to 0.11% with respect to a display region of the first substrate.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to embodiments, examples of which are illustrated in the accompanying drawings. The same or like reference numbers may be used throughout the drawings to refer to the same or like parts.

Figure 3:
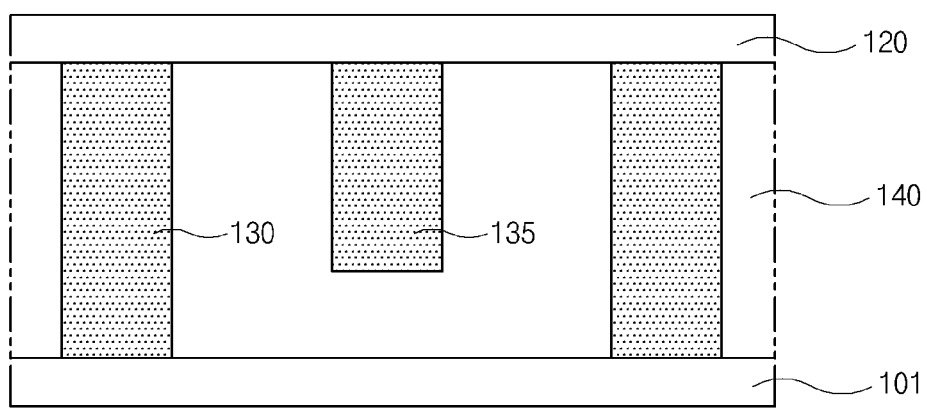
FIG. 3 is a schematic view illustrating a density of a gap column spacer of a liquid crystal panel having a first substrate and a second substrate coupled to each other according to an embodiment of the present disclosure.
Figure 4:
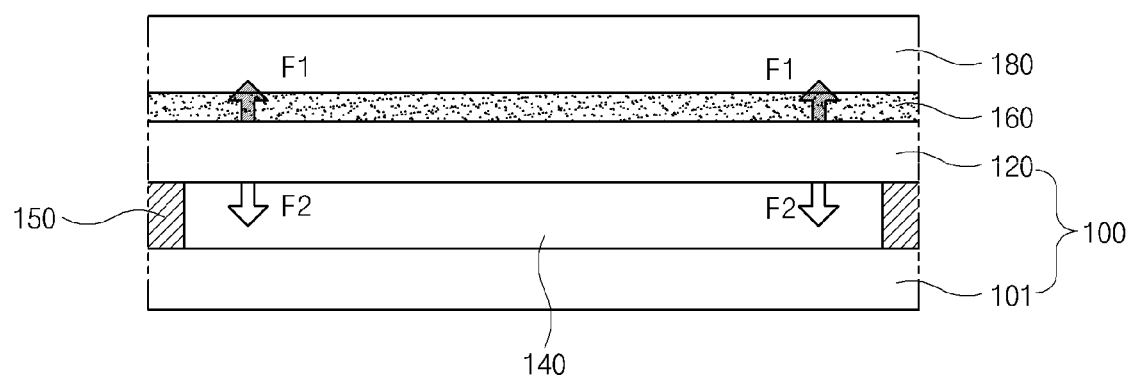
FIG. 4 is a view illustrating a touch screen LCD having a third substrate and a liquid crystal panel coupled to each other through a lamination process according to an embodiment of the present disclosure.

FIG. 3 is a schematic view illustrating a density of a gap column spacer of a liquid crystal panel having a first substrate and a second substrate coupled to each other according to an embodiment of the present disclosure, and FIG. 4 is a view illustrating a touch screen LCD having a third substrate and a liquid crystal panel coupled to each other through a lamination process according to an embodiment of the present disclosure.

Referring to FIGS. 3 and 4, a liquid crystal panel 100 includes a first substrate 101 which includes a plurality of pixels that are in a display region, are defined by gate and data lines crossing each other, and each include a TFT, a second substrate 120 which includes a color filter and a black matrix and on which a gap column spacer 130 contacting the first substrate 101 and a press column spacer 135 spaced apart from the first substrate 101 are formed, and a liquid crystal layer 140 between the first and second substrates 101 and 120.

Even though not shown in the drawings, the gap column spacer 130 and the press column spacer 135 may be formed on the black matrix of the second substrate 120 and correspond to at least one of the gate line, the data line and the TFT.

When the gap column spacer 130 and the press column spacer 135 are formed corresponding to at least one of the gate line, the data line and the TFT, an aperture ratio of the LCD 200 can be improved.

Further, the gap column spacer 130 and the press column spacer 135 may be made of a material having a property of not damaging the first substrate 101 and not having a chemical influence on the liquid crystal layer 140, for example, an organic insulating material such as BCB (benzocyclobutene), acryl based material, or the like.

In the LCD 200 of the embodiment, the gap column spacer 130 and the press column spacer 135 are formed at a specific ratio to prevent a press defect and a touch defect.

Particularly, liquid crystal margin is secured to prevent a cold bubble phenomenon and a gravity defect phenomenon, and, in order to prevent a yellowish phenomenon of the liquid crystal panel 100 happening by a lamination process of coupling the liquid crystal panel 100 to the third substrate 180 having a touch sensor, the gap column spacer 130 preferably has a density of about 0.05% to about 0.11% with respect to a display region of the liquid crystal panel 100 (i.e., about 500 ppm to about 110 ppm). In one embodiment, the density of the gap column spacer 130 with respect to the display region of the liquid crystal panel is an area density. The area density describes a ratio (i.e., a percentage) of the total area of the gap column spacer 130 that is in contact with the first substrate 101 and a total area of the display region of the first substrate 101.

Figure 1:
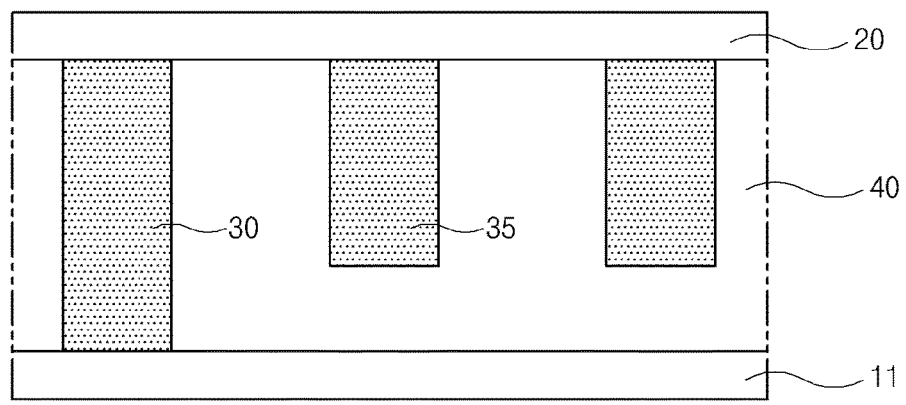
FIG. 1 is a schematic view illustrating a density of a gap column spacer of a liquid crystal panel having a first substrate and a second substrate coupled to each other according to the related art.
Figure 2:
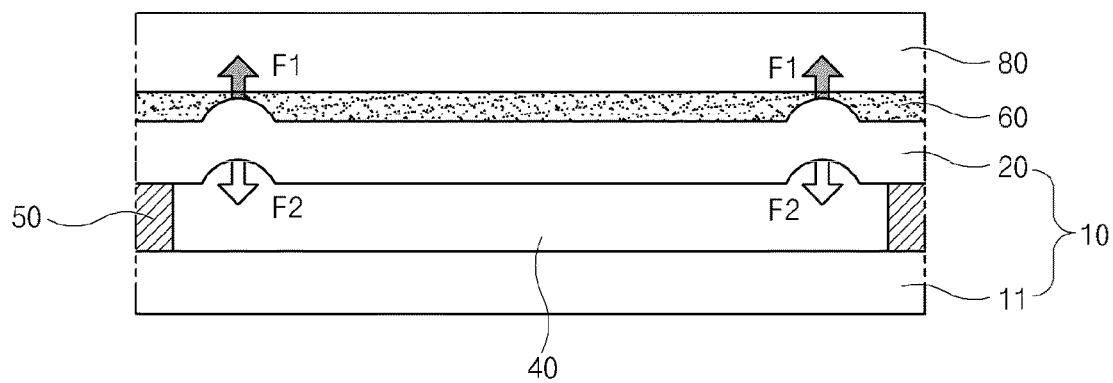
FIG. 2 is a view illustrating a touch screen LCD having a third substrate and a liquid crystal panel coupled to each other through a lamination process according to the related art.

For the purpose of explanations, in FIG. 3, a density (e.g., an area density) or a number of the gap column spacers 130 are not shown exactly, and instead, two gap column spacers 130 are shown in a meaning that a density of the gap column spacer 130 is greater than that of the related art gap column spacer (30 of FIG. 1).

Referring to FIG. 4, the touch screen LCD 200 of the embodiment is manufactured by forming an optical adhesive 160 on a top surface of the liquid crystal panel 100 (i.e., a top surface of the second substrate 120) or on a bottom surface of the third substrate 180 including the touch sensor, and coupling the third substrate 180 with the liquid crystal panel 100 by pressure through a lamination process. A seal pattern 150 is formed between edge portions of the first and second substrates 101 and 120 of the liquid crystal panel 100.

The optical adhesive 160 may be formed of an adhesive material having a high optical transmittance, for example, an OCR (optical cleared resin) or OCA (optical cleared adhesive) film.

In case of using the OCR or OCA film, this film fills an air layer between the liquid crystal panel 100 and the third substrate 180, and thus visibility of the LCD 200 can be improved, and there is an excellent effect in thermal deformation.

A cell gap of the liquid crystal panel 100 including the first and second substrates 101 and 120 is reduced by a pressure that is applied in a lamination process to couple the third substrate 180 with the liquid crystal panel 100, and then, after a period of time, the second substrate 120 receives a first tension F1 in a direction to the third substrate 180 by the third substrate 180 coupled to the second substrate 120, and receives a second tension F2 in a direction to the first substrate 101 by the gap column spacer 130 formed on the second substrate 120.

The first tension F1 is a force that the third substrate 180 attracts the second substrate 120 due to the coupling of the third substrate 180 with the second substrate 120 through the optical adhesive 160, and the second tension F2 is a force to maintain the attachment of the second substrate 120 and the first substrate 101 through the gap column spacer 130.

The first tension F1 is smaller at a center portion than at a peripheral portion, and the second tension F2 increases in proportion to a density or a number of the gap column spacer 130.

Accordingly, in the embodiment, the gap column spacer 130 in the liquid crystal panel 100 is formed at a density (e.g., area density) of about 0.05% to about 0.11% with respect to the display region of the liquid crystal panel 100 (i.e., about 500 ppm to about 1100 ppm) so that the second tension F2 is equal to or greater than the first tension F1 at the peripheral portion of the second substrate 120. In other words, an adhesion force between the second substrate 120 and the first substrate 101 increases.

Further, because the first tension F1 is greater at the peripheral portion than at the center portion of the second substrate 120, the gap column spacer 130 is formed greater in number at the peripheral portion than at the center portion of the liquid crystal panel 100. That is, the gap column spacer 130 is more highly concentrated at a peripheral portion of the liquid crystal panel 100 than at the center portion of the liquid crystal panel 100. Thus the second tension F2 corresponding to the first tension F1 is greater, and thus display quality defect due to a yellowish phenomenon can be improved.

Accordingly, after the lamination process for the liquid crystal panel 100 and the third substrate 180, the peripheral portion of the second substrate 120 is prevented from moving to the third substrate 180, and thus the cell gap of the liquid crystal panel 100 can be maintained constantly all over the liquid crystal panel 100.

Thus, a yellowish phenomenon that happens by change of liquid crystal transmittance due to increase of a cell gap at the peripheral portion the liquid crystal panel 100 can be prevented.

A table 1 as below shows vacuum test results by densities of the gap column spacer 130 of the liquid crystal panel 100 using a vacuum apparatus.

TABLE 1

| Level of liquid crystal | Vacuum Time | | |
| --- | --- | --- | --- |
| | 304 ppm | 790 ppm | 1139 ppm |
| 3.00% | 95 sec | 76 sec | 13 sec |
| 2.50% | 64 sec | 55 sec | 10 sec |
| 2.00% | 42 sec | 46 sec | 7 sec |
| 1.50% | 42 sec | 23 sec | 8 sec |
| 1.00% | 42 sec | 34 sec | 3 sec |
| 0.50% | 26 sec | 24 sec | 2 sec |
| 0.00% | 24 sec | 12 sec | 3 sec |
| −0.50% | 27 sec | 11 sec | 2 sec |
| −1.00% | 20 sec | 10 sec | 0 sec |
| −1.50% | 19 sec | 7 sec | 0 sec |
| −2.00% | 21 sec | 8 sec | 0 sec |
| −2.50% | 12 sec | 4 sec | 0 sec |
| −3.00% | 15 sec | 2 sec | 0 sec |

The vacuum test is conducted by experimentation in a environment similar to attaching the liquid crystal panel 100 to the third substrate 130 by applying pressure in the lamination process. In the test, times until a cell gap of the liquid crystal panel 100 is recovered to an original state after applying a constant pressure (low pressure) to the liquid crystal panel 100 in a state of not being coupled with the third substrate 180 using the vacuum apparatus is measured by densities of the gap column spacer 130.

As the recovery time is shorter, maintenance of the cell gap when the lamination process is conducted is better.

In Table 1, a level of liquid crystal indicates an liquid crystal filling rate compared with a case that liquid crystal fills the liquid crystal panel 100 at a filling rate of 100%.

For example, 0.00% indicates a liquid crystal filling at 100%, −1.00% indicates a liquid crystal filling at 99%, and 1.00% indicates a liquid crystal filling at 101%.

It is understood that when the liquid crystal overfills the liquid crystal panel 100, maintenance of the cell gap is disadvantageous when the liquid crystal overfills the liquid crystal panel 100, and maintenance of the cell gap is advantageous when the liquid crystal underfills the liquid crystal panel 100.

Further, in Table 1, a vacuum time indicates a time until a cell gap of the liquid crystal panel 100 is recovered to its original state after applying a constant pressure to the liquid crystal panel 100. When the vacuum time is within a range of about 10 sec to about 15 sec, a yellowish defect by a lamination process can be prevented.

Further, in Table 1, vacuum times at a "304 ppm" column are measured in the experimentation when the gap column spacer 130 is formed at a density of 304 ppm, and are 95 sec, 64 sec, 42 sec, 42 sec, 42 sec, 26 sec, 24 sec, 27 sec, 20 sec, 19 sec, 21 sec, 12 sec, and 15 sec when the levels of liquid crystals are 3.00%, 2.50%, 2.00%, 1.50%, 1.00%, 0.50%, 0.00%, −0.50%, −1.00%, −1.50%, −2.00%, −2.50%, and −3.00%, respectively.

Vacuum times at a "790 ppm" column are measured in the experimentation when the gap column spacer 130 is formed at a density of 790 ppm, and are 76 sec, 55 sec, 46 sec, 23 sec, 34 sec, 24 sec, 12 sec, 11 sec, 10 sec, 7 sec, 8 sec, 4 sec, and 2 sec when the levels of liquid crystals are 3.00%, 2.50%, 2.00%, 1.50%, 1.00%, 0.50%, 0.00%, −0.50%, −1.00%, −1.50%, −2.00%, −2.50%, and −3.00%, respectively.

Vacuum times at a "1139 ppm" column are measured in the experimentation when the gap column spacer 130 is formed at a density of 1139 ppm, and are 13 sec, 10 sec, 7 sec, 8 sec, 3 sec, 2 sec, 3 sec, 2 sec, 0 sec, 0 sec, 0 sec, 0 sec, and 0 sec when the levels of liquid crystals are 3.00%, 2.50%, 2.00%, 1.50%, 1.00%, 0.50%, 0.00%, −0.50%, −1.00%, −1.50%, −2.00%, −2.50%, and −3.00%, respectively.

Accordingly, when liquid crystal fills the liquid crystal panel 100 at a filling rate of 100%, in case of a density of the gap column spacer 130 of 304 ppm, a vacuum time is 24 sec, and thus a yellowish defect happens when a lamination process is conducted.

In consideration of the above test results, as a density of the gap column spacer 130 is higher, a force to maintain the cell gap is greater and thus a yellowish defect by a lamination process can be prevented.

Figure 5:
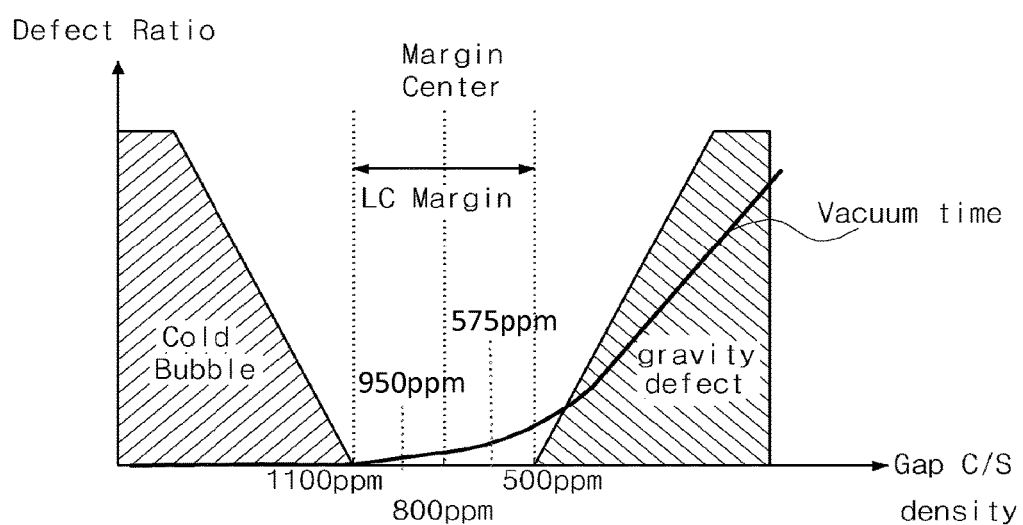
FIG. 5 is a graph illustrating a relationship between a density of a gap column spacer (Gap C/S), and a liquid crystal margin (LC Margin) and a vacuum time.

FIG. 5 is a graph illustrating a relationship between a density of a gap column spacer (Gap C/S), and a liquid crystal margin (LC Margin) and a vacuum time.

Referring to FIG. 5, a X axis of the graph indicates a density of a gap column spacer with respect to a display region of a liquid crystal panel, and the density increases in a left direction and decreases to 0 in a right direction.

Further, a Y axis indicates a defect ratio due to a cold bubble or gravity defect, and the defect ratio increases in a upper direction.

A gravity defect begins at a density of about 500 ppm, and a defect ratio due to the gravity defect increases exponentially as a density decreases from about 500 ppm.

Further, a cold bubble phenomenon begins at a density of about 1100 ppm, and a defect ratio due to the cold bubble phenomenon increases exponentially as a density increases from about 500 ppm.

In other words, in order to secure a liquid crystal margin to prevent the gravity defect and cold bubble phenomenon, a density of a gap column spacer are preferably within a range of about 500 ppm to about 1100 ppm with respect to a display region of a liquid crystal panel.

Further, a vacuum time is about 0 when a density of a gap column spacer is about 1100 ppm or greater, and increases exponentially as a density decreases from about 1100 ppm.

Accordingly, in case that a density is about 1100 ppm or greater, a vacuum time is about 0, and thus, when a lamination process is conducted, a yellowish defect can be prevented. However, in this case, a defect due to a cold bubble phenomenon happens. Accordingly, it is difficult to form a gap column spacer having a density of about 1100 ppm or greater.

As a result, referring to Table 1 and FIG. 5, when a lamination process for a liquid crystal panel and a third substrate is applied, in order to prevent a defect due to a gravity defect or cold bubble phenomenon, and a defect due to a yellowish phenomenon, a density of a gap column spacer is preferably about 500 ppm to about 1100 ppm.

In one embodiment, the density of the gap column spacer with respect to the display region of liquid crystal display can be any number of ranges between the margin center and the density associated with the formation of a cold bubble defect. For example, in one embodiment a density of the gap column spacer with respect to the display region of the liquid crystal display is 575 ppm to 1025 ppm. In another embodiment, a density of the gap column spacer with respect to the display region of the liquid crystal display is 575 ppm to 1025 ppm. In another embodiment, a density of the gap column spacer with respect to the display region of the liquid crystal display is 800 ppm to 1100 ppm. In another embodiment, a density of the gap column spacer with respect to the display region of the liquid crystal display is 950 ppm to 1100 ppm. In another embodiment, a density of the gap column spacer with respect to the display region of the liquid crystal display is 1025 ppm to 1100 ppm. In another embodiment, a density of the gap column spacer with respect to the display region of the liquid crystal display is 950 ppm to 1025 ppm. In another embodiment, a density of the gap column spacer with respect to the display region of the liquid crystal display is 875 ppm to 950 ppm. In another embodiment, a density of the gap column spacer with respect to the display region of the liquid crystal display is 800 ppm to 875 ppm. In another embodiment, a density of the gap column spacer with respect to the display region of the liquid crystal display is 875 ppm to 1025 ppm.

In one embodiment, the density of the gap column spacer with respect to the display region of the liquid crystal display can be any number of ranges between the margin center and the density associated with the formation of a gravity defect. For example, a density of the gap column spacer with respect to the display region of the liquid crystal display is 500 ppm to 800 ppm. In another embodiment, a density of the gap column spacer with respect to the display region of the liquid crystal display is 575 ppm to 725 ppm. In another embodiment, a density of the gap column spacer with respect to the display region of the liquid crystal display is 650 ppm to 800 ppm.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed is:

1. A touch screen liquid crystal display device (LCD) comprising:
   a first substrate that includes a plurality of pixels defined by crossings of gate lines and data lines, each pixel including a thin film transistor;
   a second substrate that includes a color filter and a black matrix;
   a liquid crystal layer between the first substrate and the second substrate;
   a plurality of gap column spacers on the second substrate and contacting the first substrate;
   a press column spacer on the second substrate and spaced apart from the first substrate; and
   a third substrate attached to the second substrate,
   wherein the plurality of gap column spacers have a density of 0.08% to 0.11% with respect to a display region of the first substrate.

2. The LCD of claim 1, wherein the plurality of gap column spacers are positioned at a region of the black matrix, and each of the plurality of gap column spacers corresponds to at least one of the thin film transistor, the data line, or the gate line.

3. The LCD of claim 1, wherein the press column spacer is at a region of the black matrix, and the press column spacer corresponds to at least one of the thin film transistor, the data line, or the gate line.

4. The LCD of claim 1, wherein the plurality of gap column spacers and the press column spacer are each formed of an organic insulating material.

5. The LCD of claim 1, wherein the second substrate and the third substrate are attached to each other through an optical adhesive.

6. The LCD of claim 1, wherein the plurality of gap column spacers have a density of 0.0575% to 0.1025% with respect to the display region of the touch screen LCD.

7. The LCD of claim 1, wherein the plurality of gap column spacers have a density of 0.095% to 0.11% with respect to the display region of the touch screen LCD.

8. The LCD of claim 1, wherein the plurality of gap column spacers have a density of 0.1025% to 0.11% with respect to the display region of the touch screen LCD.

9. The LCD of claim 1, wherein the plurality of gap column spacers have a density of 0.095% to 0.1025% with respect to the display region of the touch screen LCD.

10. The LCD of claim 1, wherein the plurality of gap column spacers have a density of 0.0875% to 0.095% with respect to the display region of the touch screen LCD.

11. The LCD of claim 1, wherein the plurality of gap column spacers have a density of 0.08% to 0.0875% with respect to the display region of the touch screen LCD.

12. The LCD of claim 1, wherein the plurality of gap column spacers have a density of 0.0875% to 0.1025% with respect to the display region of the touch screen LCD.

13. The LCD of claim 1, wherein the plurality of gap column spacers are more highly concentrated at a peripheral portion of the touch screen LCD than at a center portion of the touch screen LCD.

14. The LCD of claim 1, wherein the density is an area density that describes a ratio of a total area of the plurality of gap column spacers that are in contact with the first substrate and a total area of the display region of the first substrate.

15. The LCD of claim 1, wherein the third substrate includes a touch screen.

* * * * *